United States Patent [19]

Shimada

[11] Patent Number: 5,786,558
[45] Date of Patent: Jul. 28, 1998

[54] METHOD AND APPARATUS FOR CONTROLLING INVERTER RESISTANCE WELDING

[75] Inventor: Hiroshi Shimada, Chiba-ken, Japan

[73] Assignee: Miyachi Technos Corporation, Chiba-ken, Japan

[21] Appl. No.: 688,291

[22] Filed: Jul. 29, 1996

[30] Foreign Application Priority Data

Aug. 2, 1995 [JP] Japan ............................. 7-216716

[51] Int. Cl.$^6$ ............................. B23K 9/10; B23K 11/24
[52] U.S. Cl. ................................. 219/110; 219/117.1
[58] Field of Search ............................. 219/108, 109, 219/110, 116, 117.1, 118

[56] References Cited

U.S. PATENT DOCUMENTS

| | | | |
|---|---|---|---|
| 4,973,814 | 11/1990 | Kojima et al. | 219/110 |
| 5,072,090 | 12/1991 | Morita | 219/108 |
| 5,171,960 | 12/1992 | Takano et al. | 219/108 |
| 5,229,567 | 7/1993 | Kobayasji et al. | 219/110 |
| 5,343,011 | 8/1994 | Fujii et al. | 219/109 |
| 5,360,959 | 11/1994 | Takano et al. | 219/110 |

Primary Examiner—David A. Simmons
Assistant Examiner—Paul M. Rivard
Attorney, Agent, or Firm—Wenderoth, Lind & Ponack, L.L.P.

[57] ABSTRACT

Inverter-resistance welding control, for any resistance welding machine and for any welding operation, which guarantees a welding current having a quick rise time and which is free from overshoot. In particular, when a maximum allowable current value of the resistance welding machine involved has been entered and a selected current value of a particular welding operation has been entered, a CPU computes an initial pulse width of a control pulse from the maximum allowable current value and the selected current value. In a first cycle of the welding operation, the CPU supplies a first control pulse having the initial pulse width to the inverter circuit to thereby start the welding operation. The initial control pulse width is determined as a function of a machine current capacity and the desired current level of a welding operation, and may be made in proportion to a relative magnitude (ratio) of the desired current to the machine current capacity. In the subsequent cycles of the welding operation, the CPU reads the measured current value of each cycle and compares it with a selected current value to compute the deviation of the measured current value. Based on the deviation, the CPU determines a next pulse width in order that the deviation will be cancelled.

9 Claims, 5 Drawing Sheets

METHOD AND APPARATUS FOR CONTROLLING INVERTER RESISTANCE WELDING

BACKGROUND OF THE INVENTION

This invention relates to a method and apparatus for controlling an inverter resistance welding machine on a constant-current control basis.

Figure 7:
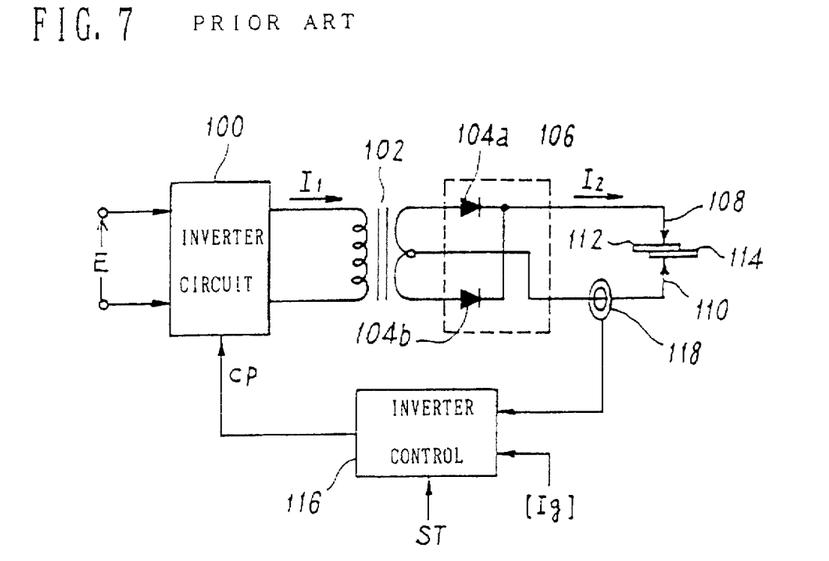
FIG. 7 is a block diagram showing an arrangement of the prior art inverter resistance welding machine system.

FIG.7 is a circuit diagram of a prior art inverter resistance welding machine. The inverter circuit 100 includes switching elements such as Giant Transistor (GTR), Insulated Gate Bipoler Transistor(IGBT), or power FET. In response to control pulses CP from the inverter control 116, the inverter circuit 100 switches the supplied DC voltage E into pulsed AC current $I_1$ (primary current) having a high frequency. The pulsed AC current $I_1$ from the inverter circuit 100 is supplied to the primary coil of the welding transformer 102. As a result, the secondary coil of the transformer supplies a secondary pulsed AC current which is proportional to the primary pulsed AC current $I_1$. The secondary pulsed AC current is converted into direct current $I_2$ by means of a rectifier circuit 106 having a pair of diodes 104a and 104b. The secondary (DC) current $I_2$ flows into workpieces 112 and 114 via welding electrodes 108 and 110.

To control the inverter resistance welding machine, a constant-current control, which includes a feedback loop that allows a constant current to be supplied to the workpieces during the welding operation, has usually been employed. A primary reason for controlling the welding current is that the welding current is one of the three major conditions of the resistance welding, the remaining two of which are weld force and weld time. Another reason for controlling the welding current is that a feedback loop of the constant-current control can easily be implemented using a toroidal coil or current transformer for measuring the welding current. The term "constant" within the meaning of the constant-current control refers to the constant in terms of the effective current value, the averaged current value or current peak value.

Figure 8:
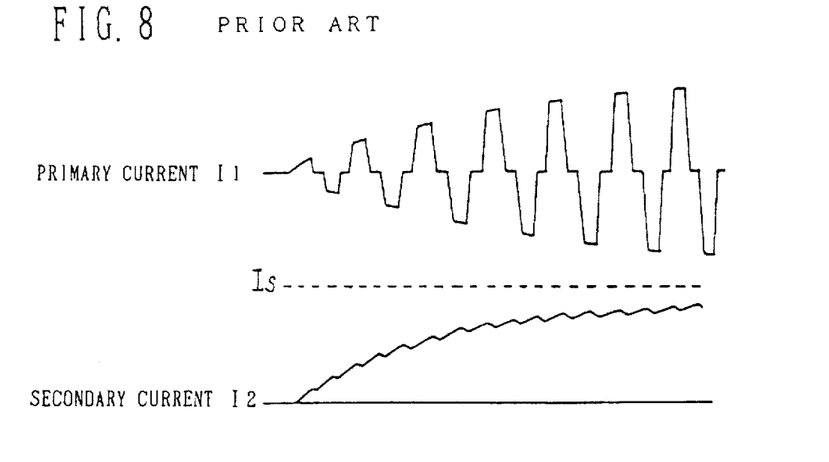
FIG. 8 shows waveforms of primary current and welding current at the beginning cycles of the welding operation, as experienced in the prior art inverter resistance welding control apparatus.

An external controller (not shown) supplies a control signal ST directing start of welding to the inverter control 116 in FIG.7. Then the inverter control 116 generates a first control pulse $CP_1$ having an initial pulse width w1 and supplies it to the inverter circuit 100 for the first cycle of the welding operation. The initial control pulse $CP_1$ turns the switching element in the inverter circuit 100 into a state of conduction for a time corresponding to the initial pulse width w1 of the control pulse $CP_1$. Thus the inverter circuit 100 outputs a corresponding pulse $I_1$ so that, in the secondary circuit of the welding transformer 102, secondary DC current $I_2$ starts to flow through the workpieces 112 and 114. The inverter control 116 determines the effective value $[I_2]$ of the secondary current from the secondary current $I_2$ measured through the current sensor (toroidal coil) 118 provided in the secondary circuit. FIG.8 shows waveforms of the primary and secondary currents $I_1$ and $I_2$.

The inverter control 116 compares the obtained effective current value $[I_2]$ with the selected current value Is to thereby determine the deviation (error, difference) of the measured current from the selected current. Then the inverter control 116 computes a second pulse width $W_2$ that will eliminate or reduce the error. In the second cycle, the inverter control 116 generates a control pulse $CP_2$ having the second pulse width $W_2$ to the inverter circuit 100. For third and following cycles, inverter control 116 repeats the operation described above.

As long as the effective current value $[I_2]$ is smaller than the selected or desired current value $[I_g]$, the pulse width in a pulse train of the control signal CP will progressively extend in time, resulting in an expansion of the corresponding pulse width expansion of the pulsed AC current $I_1$ generated by the inverter circuit 100. On the other hand, as long as the effective current value $[I_2]$ is greater than the selected or desired value $[I_g]$, the pulse width of the control pulses CP will get narrower in time, resulting in a compression of the corresponding pulse width of the pulsed AC current generated by the inverter circuit 100. In this manner constant-current control is performed using a pulse width modulation (PWM) with a feedback loop.

With the PWM constant-current control described above, the primary and secondary welding current $I_1$ and $I_2$ progressively increase towards the desired level Is (see waveforms shown in FIG. 8 at the beginning cycles of the welding operation. The rise time of the current must be minimized to assure the weld quality and productivity.

In the prior art, the pulse width $W_1$ of the control pulses CP for the first cycle of the welding operation is set to a certain initial value Ws. The initial pulse width Ws is fixed in two respects. First a plurality of different types of inverter resistance welding machines which have different welding capacities employ the same or a common initial value Ws. Second, the initial value Ws is fixed for different settings of the welding current for individual inverter resistance welding operations. Therefore, it is very hard to provide a fast and stable rise time of the current for individual welding machines and for individual welding operations.

Figure 9:
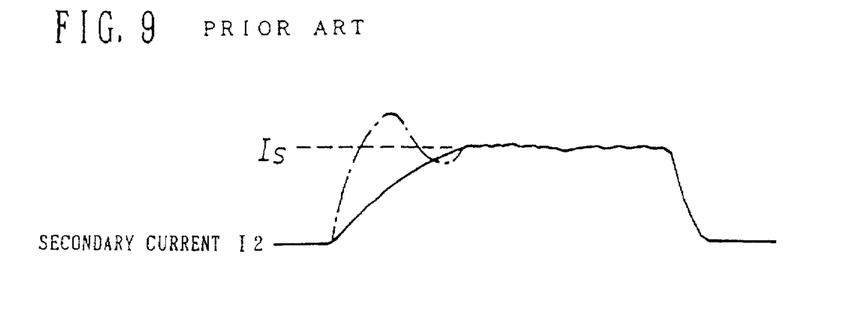
FIG. 9 is a waveform showing an overshoot of the welding current as experienced by the prior art inverter resistance a welding machine at beginning cycles of welding operation.

In any circumstances, the welding current increasing process must not experience an over shoot in which the welding current significantly exceeds the desired level as shown by a chain line in FIG.9. The overshooting of the welding current tends to produce undesirable splash. To avoid the overshoot, the prior art employs a narrower pulse width for the initial pulse width $W_1$ (Ws) of the control pulse CP. However, this necessarily requires an extended rise time of the welding current.

Some prior art employs pilot welding prior to the actual welding operation. The pilot welding procedure involves testing the welding operations using different pulse widths. The measured current value obtained with an individual pulse width is compared with the selected current value to thereby determine an optimal initial pulse width which thus depends on the selected current value. However, the pilot welding procedure consumes considerable time because it tests the welding machine for the plurality of different pulse widths. Thus it reduces the workability and productivity.

SUMMARY OF THE INVENTION

With the above problems in mind, it is, therefore, an object of the invention to provide a method and apparatus for controlling inverter resistance welding, which is capable of providing a fast and stable rise time of the current for respective welding operations and for respective welding machines.

A method of the invention for controlling an inverter resistance welding machine having an inverter in such a manner that primary or secondary current a generally maintained near a selected current value by controlling switching of the inverter by a control pulse, includes steps characterized as follows.

A maximum allowable primary or secondary current value of the resistance welding machine is determined. An initial pulse width of the control pulse from the maximum allowable current value and the selected current value. A control pulse, having the initial pulse width is supplied to the inverter for a first cycle of a welding operation. For a second or subsequent cycle of the welding operation, the inverter is supported with the control pulse having a pulse width which is computed from a deviation of a value of the current measured in a previous cycle of the welding operation, from the selected current value.

An apparatus of the invention for controlling an inverter resistance welding machine having an inverter in such a manner that primary or secondary current is generally maintained near a selected current value by controlling switching of the inverter by a control pulse, includes elements which are characterized as follows.

input means are provided for entering the selected current value and maximum allowable primary or secondary current value of the resistance welding machines. Storage means are provided for storing the selected current value and the maximum allowable current value inputted from the input means. Initial pulse width computing means are provided for computing an initial pulse width of the control pulse from the maximum allowable current value and the selected current value. Current measuring means are provided for measuring the current during welding operations. Subsequent pulse width computing means are provided for computing the deviation of a measured current value measured by the current measuring means from the selected current value to thereby compute a subsequent pulse width of the control pulse and Control pulse generating means are provided for supplying the inverter with the control pulse having the pulse width obtained from the initial pulse width computing means in a first cycle of the welding operation and for supplying the inverter with the control pulse having the pulse width obtained from the subsequent pulse width computing means in a subsequent cycle of the welding operation.

The term "cycle" refers to a cycle in which one control pulse is supplied to the inverter. It typically corresponds to one cycle or a half cycle of the inverter frequency.

In accordance with the invention, the maximum current value allowable for the inverter resistance welding machine involved in constant-current control is determined. A desired current value (reference value) of welding operation for constant-current control is determined. Then the initial control pulse width used for the first cycle of the welding operation is determined or computed from the maximum allowable current value and the desired preselected current value. In a first cycle of the welding operation, the inverter switching is controlled by a control pulse having the initial pulse width thus determined. In any second or subsequent cycle, the inverter switching is controlled by a subsequent control pulse having a pulse width computed based on the feedback control. With the method or apparatus of the invention, welding operation always starts with an optimal pulse width which is optimized for the current capacity of the welding machine involved in the welding operation and the preselected current value of the welding operation, as a function thereof.

BRIEF DESCRIPTION OF THE DRAWINGS

The above and other objects, features and advantages of the invention will become more apparent from the following description taken in conjunction with the drawings in which.

DETAILED DESCRIPTION OF THE PREFERRED EMBODIMENT

The invention will now be described in detail with respect to an illustrated embodiment by reference to FIGS. 1 to 6.

Figure 1:
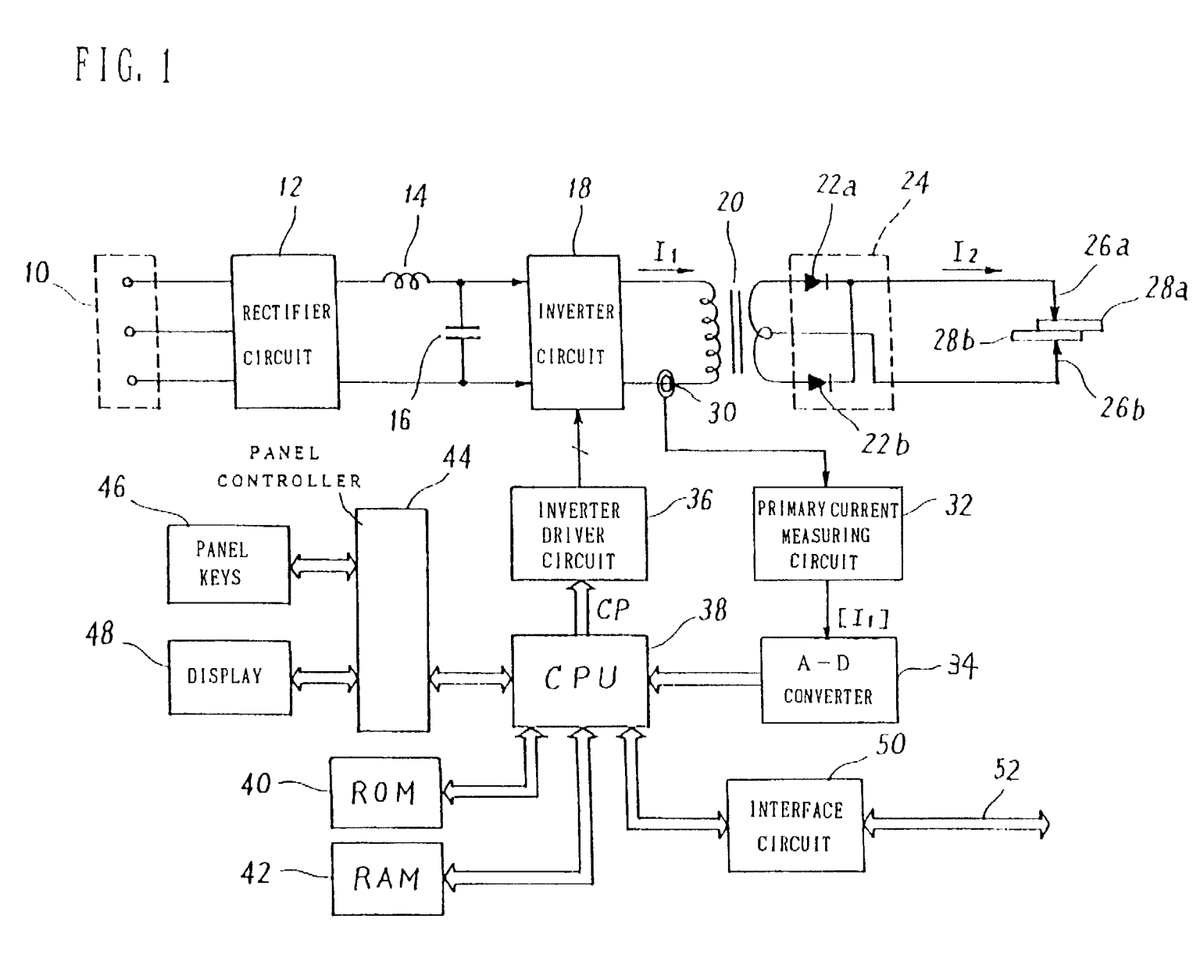
FIG. 1 is block diagram of an inverter resistance welding machine system to which one embodiment of an inverter resistance welding control apparatus of the invention is applied.

FIG. 1 shows an arrangement of an inverter resistance welding machine and one embodiment of a control apparatus in accordance with the invention.

A three-phase commercial AC electric power supply terminal 10 that receives a three-phase AC commercial electric power is connected to an input terminal of a rectifier circuit 12. The rectifier circuit 12 generates, at its output, a rectified current. A smoothing circuit including a coil 14 and a capacitor 16 smoothes the rectified current. The smoothed DC current is supplied to an inverter circuit 18. The inverter circuit 18 includes switching elements, such as GTR, IGBT or the like, and switches the smoothed DC current into a high frequency AC current of pulses (rectangular pulse). The switching operation of the inverter circuit 18 and, therefore the pulse width of the high frequency AC output thereof is controlled by a control pulse CP supplied from CPU 38 via an inverter driver circuit 36.

The high frequency AC output voltage from the inverter circuit 18 is applied across the primary coil of a welding transformer 20. The secondary coil of the welding transformer 20 induces a step-down high frequency AC voltage thereacross. The high frequency AC current from the secondary coil of the welding transformer is supplied to a rectifier circuit 24 having a pair of diodes 22a and 22b. The rectifier circuit 24 converts the high frequency AC current into DC secondary current $I_2$ which flows through workpieces 28a and 28b via welding electrodes 26a and 26b.

The present resistance welding control apparatus includes a current sensor (eg., toroidal coil) 30, a primary current measuring circuit 32, an analog-to-digital converter 34, a CPU 38, an inverter driver circuit 36, a ROM 40, a RAM 42, a panel controller 44, a panel key 46, a display 48 and an interface circuit 50.

The current sensor 30 is provided in the primary circuit of the welding machine between the inverter circuit 18 output and the primary coil of the welding transformer 20 so as to surround a primary electric wire to generate a signal indicative of the waveform of the primary welding current $I_1$ or the derivative thereof. The primary current measuring circuit 32 determines the effective value of the primary current $I_1$ from the output signal of the current sensor 30 in each cycle on half cycle. The measured value $[I_1]$ of the primary current, in analog form, obtained from the primary current measuring circuit 32 is converted into a corresponding digital signal by the analog-to-digital converter 34. The digitized signal of the measured current is received by CPU 38.

CPU 38 reads the measured current value $[I_1]$ of each cycle from the primary current measuring circuit 32 and compares it with a stored (registered) selected current value [Is] to thereby compute the deviation of the measured current value. Based on the deviation, CPU 38 determines a next pulse width $W_{i+1}$ in order that the deviation will be cancelled. In the next cycle, CPU generates a control pulse $CP_{i+1}$ having the pulse width $W_{i+1}$ thus determined. The combination of the current sensor 30, primary current measuring circuit 32, analog-to-digital converter 34, CPU 38 and inverter driver circuit 36 defines a pulse width modulation constant-current control circuit with a feedback loop that controls the switching of the inverter circuit 18 so that the primary current $I_1$ generally maintains near the selected current value [Is].

ROM 40 stores programs for controlling CPU 38. The stored programs include a control program for providing the constant-current control described above, a display program for providing man-machine interface on the control panel, a key input routine, a communication program for data communication with an external device via the interface circuit 50, and so on.

RAM 42 stores various selected values as registered data. Further RAM 42 temporarily stores measured results of the welding operation, and intermediate and final data from CPU 38. The contents of RAM 42 may be held by a backup battery. The panel controller 44 receives and transmits signals between the CPU 38, and keys 46 and a display 48 (e.g., liquid crystal display and LED indicators) disposed on the control panel.

The interface circuit 50 is connected to CPU 38 via an internal bus. The interface circuit 50 is also connected via a communication cable 52 to an external device such as a welding robot controller, weld start switch and/or welding schedule programming unit.

In the present resistance welding control apparatus, the panel keys 46 may be operated to enter the maximum current capacity or maximum allowable current value $[I_{MAX}]$ of the resistance welding machine involved. The maximum allowable current value $[I_{MAX}]$ is intrinsically or inherently determined by the configuration and condition of the resistance welding machine involved. In place of the exact value of the inherent maximum allowable current, an approximate value may be entered. If desired, the maximum allowable current may be measured and the measured result may be entered. For instance, the maximum allowable current value $[I_{MAX}]$ may be determined or computed from the measured current value $[I_1]$ when control pulses CP having the maximum pulse width $W_{MAX}$ is inputted to the inverter circuit 18.

When a feedback control is applied to the primary circuit, as in the present embodiment, the maximum allowable current value entered from the panel keys 46 may normally be expressed in terms of the primary circuit. The ratio of primary to secondary welding current can, however, be determined by the turns ratio of the welding transformer 18. Thus the maximum allowable secondary current value may be entered instead. Then CPU 38 may convert or scale it into the maximum allowable primary current.

Figure 2:
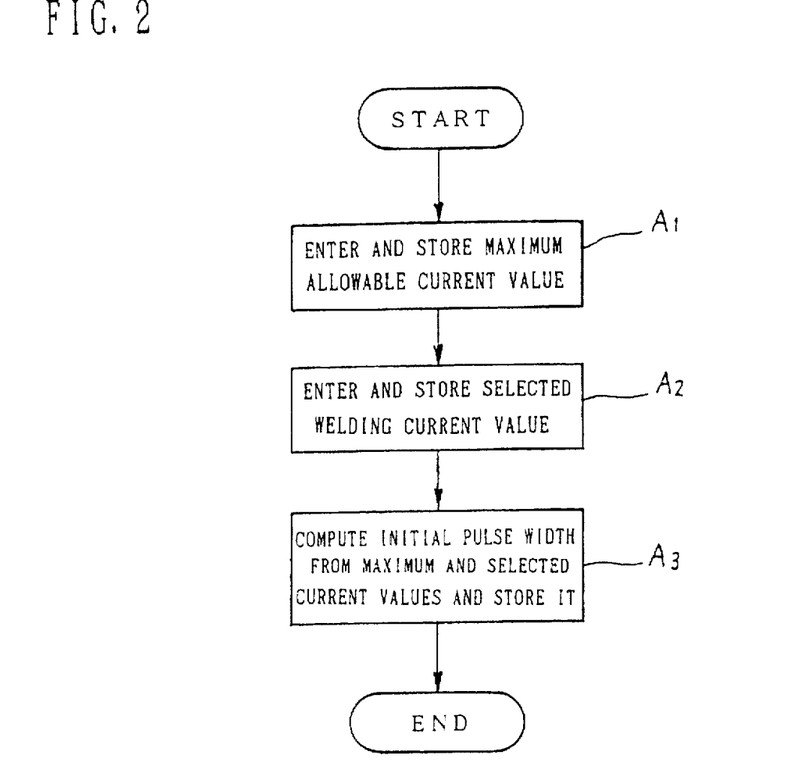
FIG. 2 is a flow chart showing a process of a CPU in FIG. 1 for entering and storing a maximum allowable current value and a selected welding current value, in accordance with the invention.

FIG. 2 is a flow chart showing a process of CPU 38 for entering and storing the maximum allowable current value $[I_{MAX}]$ and the selected current value [Is]. The entered maximum allowable current value $[I_{MAX}]$ is written into RAM 42 at a predetermined storage location for registration (step $A_1$). A selected current value [Is] of a particular welding operation is entered (step $A_2$). Then CPU 38 computes an initial pulse width WS from the maximum allowable current value $[I_{MAX}]$ and the selected current value [Is] according to a predetermined formula, for example, the one (1) given below (step $A_3$). $Ws = W_{MAX} \times I_s / I_{MAX} \ldots$ (1), in which $W_{MAX}$ indicates the predefined maximum pulse width. The initial pulse width Ws defines the pulse width of the first control pulse CP1 which is generated in the first cycle of the welding operation. The initial pulse width data Ws, thus computed, is written into RAM 42 at a predetermined storage location.

For respective welding operations, selected current value data [Is] may be independently determined. In such a case CPU repeats steps $A_2$ and $A_3$ for respective selected current value data [Is], using the common maximum allowable current value data $[I_{MAX}]$.

Figure 3:
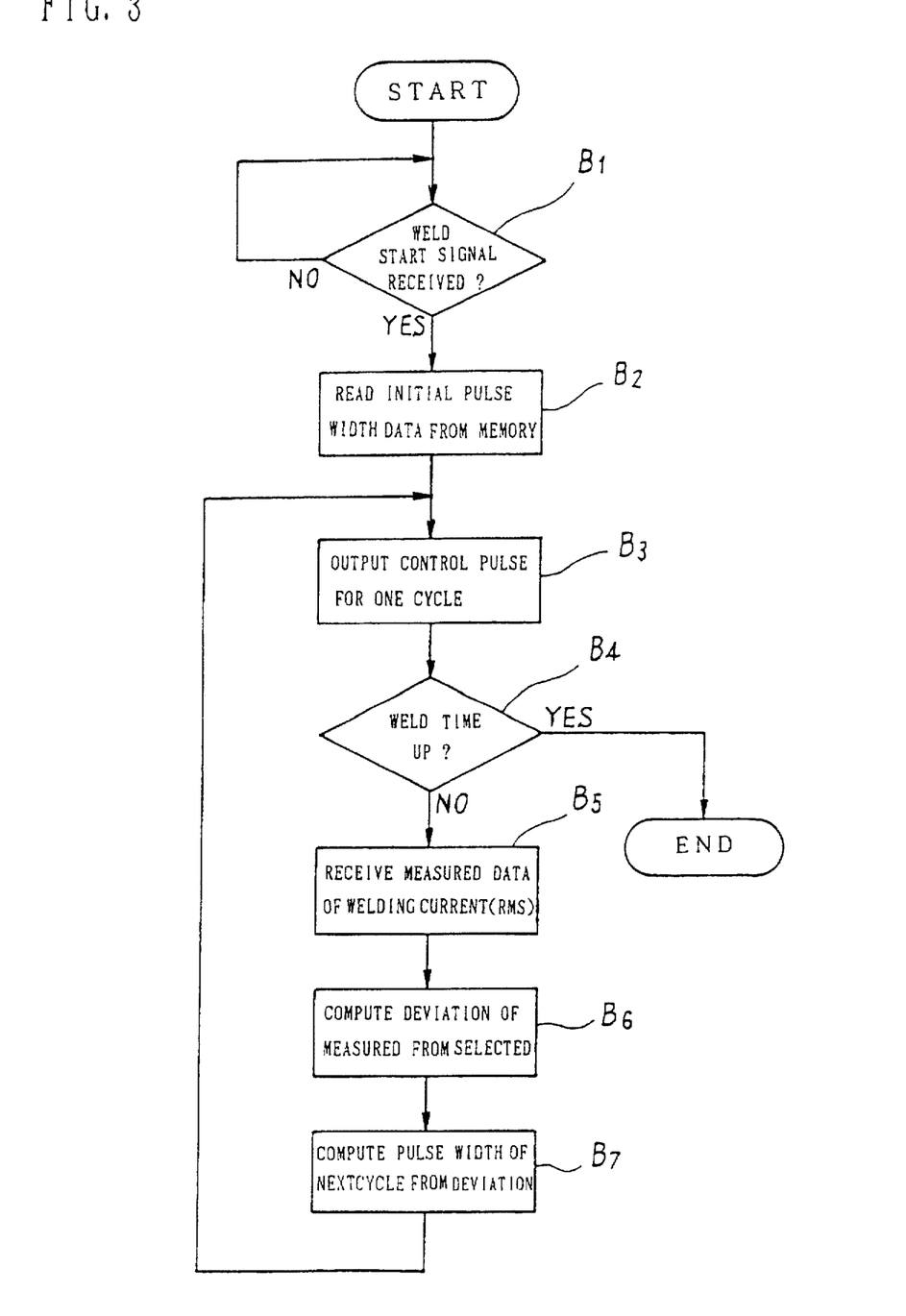
FIG. 3 is a flow chart of a process of the CPU in FIG. 1 for providing pulse width modulation control during a welding operation, in accordance with the invention.

FIG. 3 is a flow chart showing a process of the CPU 38 for providing pulse width modulation control during welding operation.

When it has received a weld start signal from the external device via the interface circuit 50 (step $B_1$), CPU 38 reads, from storage (RAM 42), the initial pulse width data Ws as well as other parameters (selected current value data, weld time data, etc.,) of the weld schedule responding to the weld start signal (step $B_2$) to start the welding operation. Then CPU 38 generates a first control pulse CP1 having the initial pulse width Ws (step $B_3$). Thus, in the first cycle of the welding operation, the switching elements in the inverter circuit 18 are switched into conducting for a time corresponding to the initial control pulse width Ws, so that AC primary current $I_1$ starts to flow through the primary circuit and DC secondary current (welding current) $I_2$ starts to flow through the secondary circuit. The primary welding current I1 of the first cycle of the welding operation is measured by the primary current measuring circuit 32 via the current sensor 30. Then CPU 38 receives the measured value of the primary current $[I_1]$, expressed in RMS (step $B_5$). CPU 38 computes the error or deviation of measured current value $[I_1]$ from the selected current value $[I_s]$ (step $B_6$). Then CPU 38 computes a new or second control pulse width $W_2$ from the error so that the error will be cancelled (step $B_7$).

For the next or second cycle of the welding operation, CPU 38 generates and supplies a control pulse $CP_2$ having the pulse width $W_2$ (step $B_3$). Thus, in the second cycle of the welding operation, the switching elements in the inverter circuit 18 are switched into conduction for a time corresponding to the second control pulse width $W_2$ so that the primary and secondary current $I_1$ and $I_2$ of the second cycle will become greater than that of the first cycle.

The primary current $I_1$ of the second cycle is measured similarly. CPU 38 reads the measured value $[I_1]$ thereof (step $B_5$), computes the error of the measured value from the selected current value [Is] (step $B_6$) and computes a third control pulse width $W_3$ to reduce the error (step $B_7$). Then, for the third cycle of the welding operation, CPU 38 generates a third control pulse CP$_3$ having the pulse width W$_3$ (step B$_3$). The process of the steps B$_3$ to B$_7$ repeats for subsequent cycles until the weld time has finished (step B$_4$).

In this manner, the present resistance welding control apparatus uniquely determines an initial control pulse width W$_s$, corresponding to a selected current value [Is] desired for the welding operation to be performed and from the maximum allowable welding current value [I$_{MAX}$] of the inverter resistance welding machine involved. In the first cycle of the welding operation with the selected current [I$_s$], the apparatus supplies the inverter circuit 18 with a first control pulse CP1 having the initial pulse width Ws. For the second and subsequent cycles of the welding operation, the apparatus supplies the inverter circuit 18 with subsequent control pulses having a pulse width determined from the error of the actual primary current measurement [I$_1$] of a previous cycle from the selected or desired current value [Is].

With the arrangement of the present resistance welding control apparatus, welding operation always starts with an appropriate initial pulse width Ws since it is optimized for the current capacity of the inverter resistance welding machine involved and the desired welding current value [Is] selected for the welding operation to be performed. Thus, the welding current can reach the desired current value [Is] in a minimum time without experiencing any overshoot. Once established, the welding current is maintained near the desired current level until the welding operation finishes.

Figure 4:
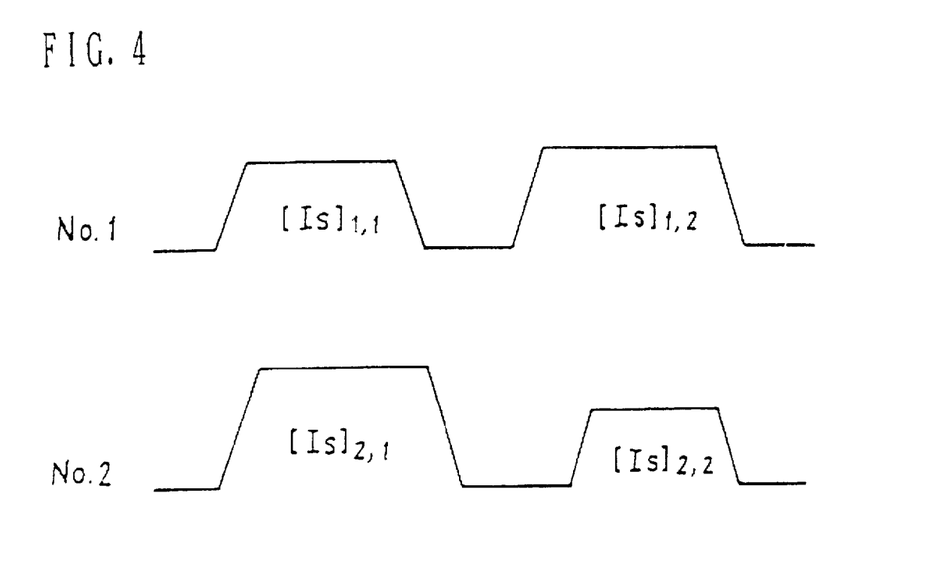
FIG. 4 shows waveforms of the secondary current for different welding schedules which employ independently selected current values for individual welding operations.

FIG. 4 shows waveforms of the secondary current in a sequence of different welding operations with independently selected current values according to a welding schedule. For example, according to the welding schedule No. 1, the first and second welding operations involve independently selected current values [Is]$_{1,1}$ and [Is]$_{1,2}$ respectively. According to the welding schedule No. 2, the first and second welding operations employ individually selected current values [Is]$_{2,1}$ and [Is]$_{2,2}$.

In accordance with the present resistance welding control apparatus, initial control pulse widths [Ws]$_{1,1}$, [Ws]$_{1,2}$, [Ws]$_{2,1}$[Ws]$_{2,2}$ etc., are individually determined from a maximum allowable current value [I$_{MAX}$], indicative of the current capacity of the inverter resistance welding machine involved, and from respective selected current values [Is]$_{1,1}$, [Is]$_{1,2}$, [Is]$_{2,1}$, [Is]$_{2,2}$ etc., each indicative of a desired magnitude or level of current (steps A$_2$ and A$_3$ in FIG. 2). When any particular welding operation of any particular welding schedule starts, the inverter switching begins with an initial control pulse width optimized as a function of the desired current level for that welding operation as well as the current capacity of the welding machine (steps B$_2$ and B$_3$ in FIG. 3).

In this manner, when starting a welding operation, desired initial control pulse width [Ws] is chosen for a desired selected current value [Is] and is applied to a pulse width modulation constant-current control so that the current can rise up in a minimum time without experiencing overshoot. Therefore, a method and apparatus of the invention makes best use of a pulse width modulation constant-current control for an inverter resistance welding machine, and is thus capable of improving weld quality and productivity.

A method and apparatus of the invention for controlling inverter resistance welding is particularly suitable for certain types of resistance welding, such as projection welding and seam welding, in which the welding current must quickly reach the desired level to assure satisfactory weld quality.

Figure 5:
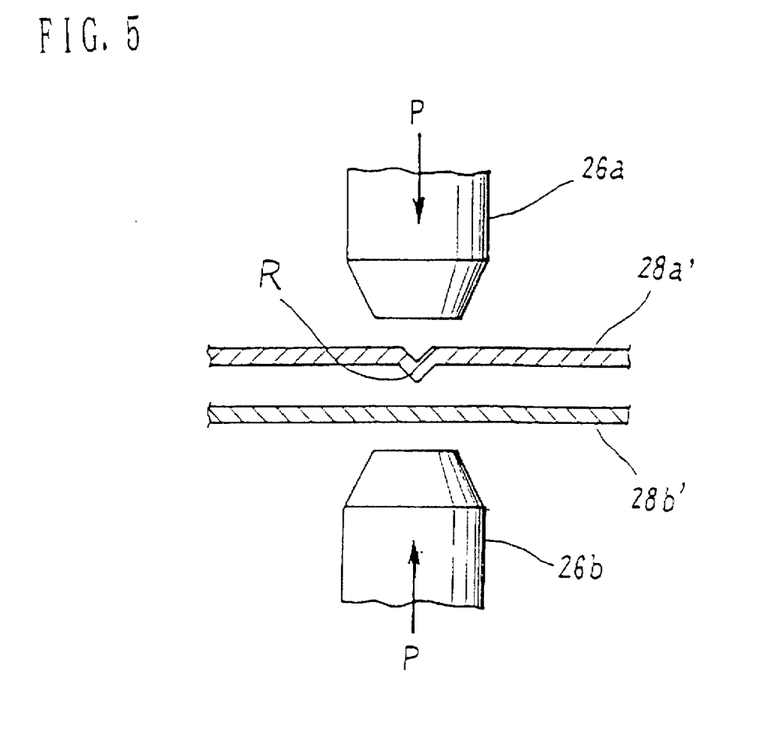
FIG. 5 is a view of a projection welding to which a method and apparatus of the invention can advantageously be applied.

FIG. 5 illustrates projection welding. One of the workpieces, 28a', may be a plate of first material, say, copper, and the other one 28b' may be a second material, say, iron plate. The workpieces 28a' and 28b' of such materials are hard to join or weld together. In such a case, one of the workpieces 28a' is formed with a projection R at a position to be joined. At the beginning of the welding operation, the projection R experiences concentrated current flowing there through and thus a large amount of heat is generated by the resistance thereof. When the workpiece starts to be melted, a high pressure P is suddenly applied to a pair of electrodes 26a and 26b. Thus, the projection R is deformed or flatted by pressure to undergo resistance welding.

It is desired for the projection welding that the projection R generates a large amount of heat by resistance immediately after the start of the welding operation. To this end the welding current must rise up in the a shortest amount of time as possible. This requirement for the projection welding can be successfully met in accordance with the method and apparatus of the invention for controlling the inverter resistance welding. Using the method and apparatus of the invention, the projection welding produces satisfactory weldment.

Figure 6A:
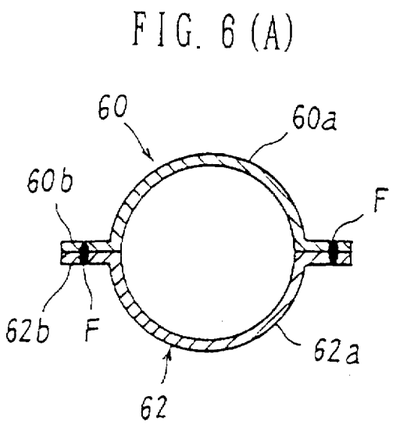
FIGS. 6A and 6B are views of intermittent seam welding to which a method and apparatus of the invention can advantageously be applied.
Figure 6B:
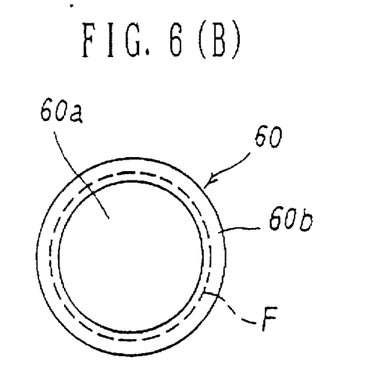
Figure 6C:
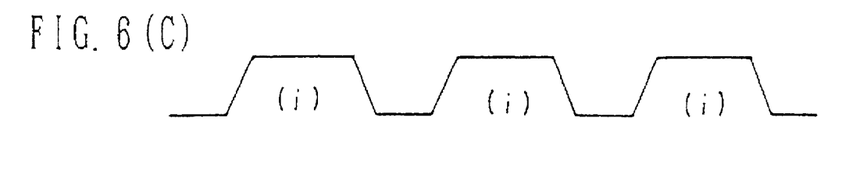
FIG. 6C shows a waveform of the secondary current for the intermittent seam welding of FIGS. 6A and 6B.

FIGS. 6A-6C illustrate a seam welding of intermittent current type. A pair of workpieces 60 and 62 each have a hemisphere 60a, 62a formed with an annular flange 60b, 62b. The flanged workpieces 60 and 62 are butted each other. While angularly shifting workpieces 60 and 62, relative to the electrodes 26a and 26b, step by step in a circumferential direction, the welding current is intermittently and repeatedly applied to respective abutment points F of the workpieces at regular interials. Thus the welding current (secondary current) flows cyclically and intermittently as shown in FIG. 6.

In such a seam welding, the welding operation is done intermittently and in a short time for each point F to be welded. Thus if the current rises slowly, it will shorten a net weld time so that it is difficult to provide a satisfactory joint at individual weld points F. A method and apparatus of the invention for controlling inverter resistance welding can successfully be applied to the intermittent-current seam welding, thus providing short current rise time at respective weld point F and thus yielding satisfactory weldment.

The illustrated embodiment employs a pulse width modulation constant-current control having a feedback loop with respect to the primary current I$_1$. Instead, a current sensor may be provided in the secondary circuit of the welding machine, and a constant-current control may be applied to the secondary current I$_2$. Whereas, in the illustrated embodiment, a dedicated hardware circuit, current measuring circuit 32, is employed to compute the current value (RMS) for each cycle, a programm-controlled CPU 38 may compute or determine the measured current value of each cycle.

The value of the maximum allowable current, I$_{MAX}$, may be updated as required for a change of the configuration of the resistance welding machine and/or for aging thereof. The formula (1) according to which the initial control pulse width Ws is computed from the maximum allowable current value [I$_{MAX}$] and the selected current value [Is] is merely illustrative. Corrections and other conditions may be added to optimally compute the initial pulse width as a function of the maximum current and selected current values.

In accordance with the method and apparatus of the invention for controlling inverter resistance welding, a welding operation starts with an initial control pulse width optimized from the capacity of the inverter resistance welding machine and a selected current value. Therefore, for an inverter resistance welding machine involved and for a welding operation required, welding current rapidly reaches the selected current level without experiencing overshoot. The method and apparatus of the invention makes best use of a pulse width modulation constant-control, and significantly improves weld quality and productivity.

What is claimed is:

1. A method for controlling an inverter resistance welding machine having an inverter, said method comprising:

computing an initial pulse width based on a ratio of a selected current value to a maximum allowable current value of the welding machine;

controlling the inverter with a control signal having a predetermined high-frequency;

supplying the inverter of the welding machine with a first control pulse within said control signal during a first cycle of a welding operation, said first control pulse having a width equal to said initial pulse width;

measuring an actual current value of the welding machine and computing a deviation between said actual current value and said selected current value during cycles of the welding operation; and supplying the inverter of the welding machine with a subsequent control pulse within said control signal during cycles subsequent to the first cycle of the welding operation, said subsequent control pulse having a width computed based on said deviation such that said actual current value of the welding machine is maintained at a value near said selected current value.

2. The method according to claim 1, further comprising determining said maximum allowable current value by supplying, within said control signal, a control pulse having a maximum pulse width to the inverter, measuring said actual current value of the welding machine, and determining said maximum allowable current value based on said actual current value.

3. The method according to claim 1, wherein said actual current value is measured and said deviation is computed during each cycle of the welding operation.

4. The method according to claim 1, wherein said subsequent control pulse is supplied to the inverter during a second cycle of the welding operation.

5. The method according to claim 1, wherein said subsequent control pulse is supplied to the inverter during each cycle, subsequent to the first cycle, of the welding operation.

6. The method according to claim 1, further comprising determining said maximum allowable current value based on a maximum allowable secondary current value and a turns ratio of a welding transformer of the welding machine.

7. An apparatus for controlling an inverter resistance welding machine having an inverter, said apparatus comprising:

input means for entering a maximum allowable current value of the welding machine and a selected current value;

storage means for storing the selected current value and the maximum allowable current value inputted through said input means;

control means for controlling the inverter with a control signal having a predetermined high-frequency;

initial pulse width computing means for computing an initial pulse width based on a ratio of said selected current value to said maximum allowable current value;

current measuring means for measuring an actual current value of the welding machine during a welding operation;

subsequent pulse width computing means for computing a deviation between said actual current value and said selected current value and for computing a subsequent pulse width based on said deviation; and control pulse generating means for supplying, during a first cycle of the welding operation, a first control pulse within said control signal, to the inverter of the welding machine, said first control pulse having a width equal to said initial pulse width computed by said initial pulse width computing means, and for supplying, during cycles subsequent to the first cycle of the welding operation, a subsequent control pulse, within said control signal, to the inverter of the welding machine, said subsequent control pulse having a width equal to said subsequent pulse width computed by said subsequent pulse width computing means such that said actual current value of the welding machine is maintained at a value near said selected current value.

8. The apparatus according to claim 7, further comprising:

maximum allowable current determination means for determining said maximum allowable current value by supplying, within said control signal, a control pulse, having a maximum pulse width to the inverter, measuring said actual current value of the welding machine, and determining said maximum allowable current value based on said actual current value.

9. The apparatus according to claim 7 further comprising:

means for entering a maximum allowable secondary current value; and means for determining said maximum allowable current value based on said maximum allowable secondary current value and a turns ratio of a welding transformer of the welding machine.

* * * * *